United States Patent [19]

Pieper

[11] Patent Number: 4,882,736
[45] Date of Patent: Nov. 21, 1989

[54] METHOD FOR EFFICIENTLY USING FLUE GAS ENERGY IN A GLASS FURNACE

[75] Inventor: Helmut Pieper, Lohr am Main, Fed. Rep. of Germany

[73] Assignee: Sorg GmbH & Co. KG, Lohr am Main, Fed. Rep. of Germany

[21] Appl. No.: 195,514

[22] Filed: May 18, 1988

[30] Foreign Application Priority Data

May 30, 1987 [DE] Fed. Rep. of Germany ....... 3718276

[51] Int. Cl.⁴ .............................................. C03B 5/027
[52] U.S. Cl. ........................................ 373/32; 65/134
[58] Field of Search ................................. 373/30–34; 65/134, 135, 136, 335, DIG. 4

[56] References Cited

U.S. PATENT DOCUMENTS 2,658,095 11/1953 Arbeit et al. ........................ 373/31
3,108,149 10/1963 Carney et al. ...................... 373/31
3,218,144 11/1965 Touvay .............................. 373/31

Primary Examiner—Roy N. Envall, Jr.
Attorney, Agent, or Firm—Felfe & Lynch

[57] ABSTRACT

Raw materials are fed into the charging end of a melting section which is heated by electrodes in the glass bath. The melted charge is then clarified under fossil fuel burners in a clarifying section, where the highest temperature of the furnace is maintained, and homogenized in a homogenizing section from which the clarified melt is drawn. Flue gas from the clarifying section sweeps the surface of the melting section countercurrently to the charge and is then used to heat combustion air. Burners in the clarifying section are operated under air starved conditions to reduce nitrogen oxides, while burners in the melting section are operated with excess air to achieve complete combustion.

16 Claims, 9 Drawing Sheets

METHOD FOR EFFICIENTLY USING FLUE GAS ENERGY IN A GLASS FURNACE

BACKGROUND OF THE INVENTION

The present invention is in an energy saving method of melting glass in a glass melting furnace in which the charge is melted down in a melting section, while the batch of raw materials is delivered into the beginning of the melting section and fed with energy from underneath the charging end. The melted charge is then clarified in a clarifying section adjoining the melting section, then homogenized in a homogenizing section of increased bath depth adjoining the latter section, and drawn from the homogenizing section. The present invention is also in a glass melting furnace for the practice of this method, the furnace having a melting section, a homogenizing section of increased bath depth, and a clarifying section of lesser bath depth disposed between them in which burners are disposed for the input of fossil energy, the exhausting of the combustion gases and the input of the batch being performed at the beginning of the melting section.

Glass melting furnaces have a common disadvantage that despite the use of recuperators or regenerators they have a relatively low efficiency from an energy point of view. This low efficiency is not due to deficient insulation of the glass tanks, but to the fact that the furnace exhaust gas contains considerably more thermal energy than needed preheat combustion air. There are limits to the temperature to which the combustion air can be raised, since this makes heat exchange very difficult, but the great disadvantage is especially that the concentration of the toxic nitrogen oxides greatly increases.

Various attempts have already been made to use the exhaust gas excess heat in a rational manner. One such attempt involves preheating the charge of raw materials before introducing these materials into the glass melting tank. These attempts, however, have been unsuccessful, because the heating can bring about premature fusion of some of the batch components, causing them to stick to the heat exchange surfaces. On the other hand, if the exhaust gas comes in contact with the batch not only are certain components prematurely fused, but also separation occurs or certain components of the batch are picked up by the exhaust gas, thereby unacceptably increasing the dust content in the exhaust and necessitating the use of expensive dust filter equipment.

It is an object of the invention to provide a method for melting glass, and a glass melting furnace, which will no longer suffer the above-stated disadvantages, but which will have a considerably improved efficiency, while at the same time being economical to build, and especially one in which lower $NO_x$ concentrations will be present along with a lower dust content in the exhaust, without the necessity of dealing with hot, hard-to-handle components in the furnace or in the heat exchange system.

Another object is to provide a furnace wherein the upper furnace temperatures and the temperatures in the heat exchangers (recuperators) are lower than in the commonly known furnaces.

In addition to the above-named advantages, the furnace according to the invention is to be economical to produce and safer in operation, and, in case of need, an extensive exchange of fossil and electrical energy is to be possible.

SUMMARY OF THE INVENTION

The above objects and others are obtained by the invention wherein the fossil fuel burners in the clarifying section furnish the predominant supply of melting energy, the flue gases sweep over the charge countercurrently and are vented close to the charge entrance, and the melting section is swept on the surface by a flow coming from the clarifying section countercurrently to the charge, and the flame radiation from the clarifying section is absorbed by means present at its boundary and above the melting section, and by dividing the space above the melt into zones of different temperature in which the highest temperature is in the clarifying section.

Advantageously the method is practiced such that in the clarifying section (zone I) with the highest temperature the burners are operated under air-starved conditions to reduce the formation of nitrogen oxides, and in the section (zone II) of lower temperature, through which the flue gas next flows, the burners disposed at the entry thereof are operated with excess air to achieve complete combustion.

In order to form the hot flow as a countercurrent to the movement of the charge the bottom of the apparatus melting section slopes downwardly from the clarifying section to the end where the charge enters. The roof of the furnace has at least one radiant heat shield extending down to just above the bath surface between the clarifying section (zone I) and the melting section (zone II). Electrical energy is supplied in the charge entrance area by electrodes. The combustion air is heated by heat exchangers.

Electrodes disposed under the area of the entry of the charge advantageously cause a downward flow to form beside them toward the clarifying section. This flow pattern deflects the hot glass stream in the melting section downwardly thereby intensifying the back flow along the bottom toward the clarifying section.

The thermal transfer by radiation from the burner section, which reduces efficiency, is advantageously prevented by the radiant heat shields provided between the clarifying and melting sections and in the melting section.

A special advantage of the glass melting method and furnace according to the invention is that the exhaust gases are cooled to 800° to 1000° C. by preheating the charge lying on the glass bath up to the exit from the tank chamber, and without any great technical difficulty the recuperators can at the same time heat the air countercurrently to about 700° C.

It can be seen that the glass melting furnace according to the invention, in conjunction with the method of its operation, is capable of solving the stated problems in an especially advantageous manner. The principle of the invention is to feed the batch onto the glass bath and there to preheat it with the exhaust gas so as to cool the exhaust gas to such an extent that the remaining energy can be used almost entirely for heating the combustion air. The maintenance of the fluidity of the glass and the establishment of an optimum pattern of flow in the charge-preheating part of the tank is at the same time assured by the input of comparatively small amounts of electrical energy.

DESCRIPTION OF A PREFERRED EMBODIMENT

Figure 1:
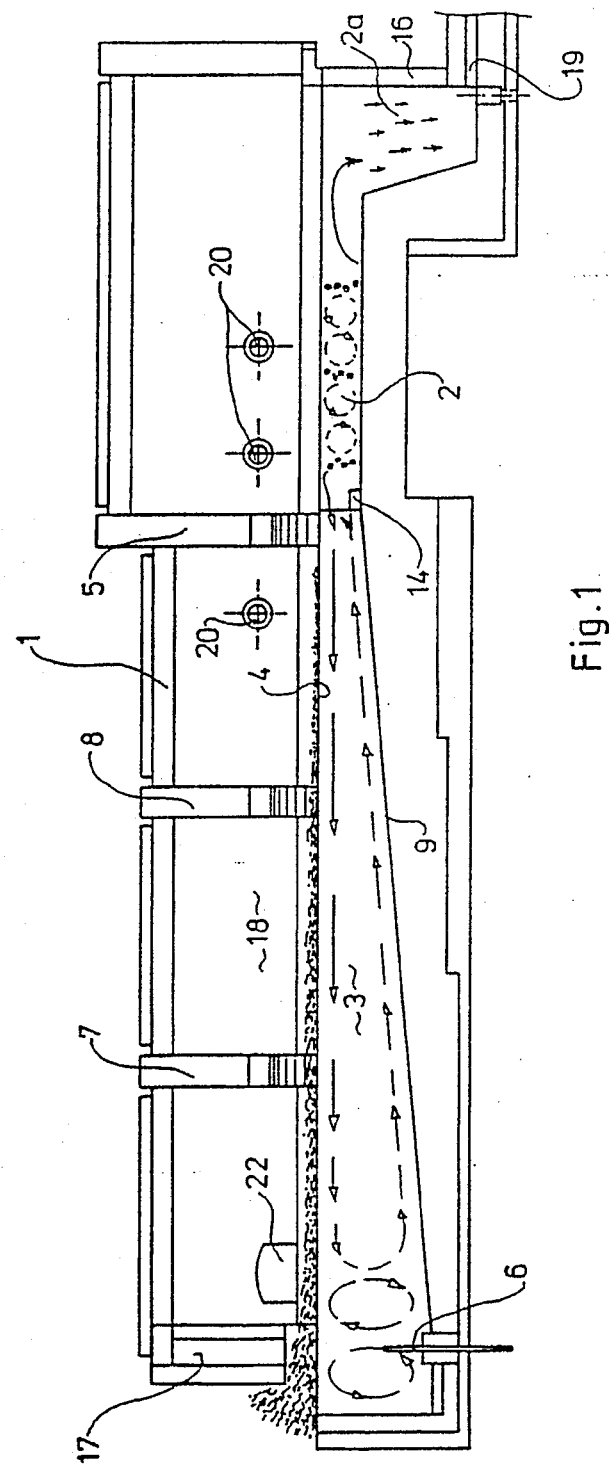
FIG. 1 is a front elevation view in cutaway of a glass furnace according to the invention.

Generally referring to the drawings, a glass melting furnace A according to the invention consists of an elongated, rectangular tank B with a clarifying section 2 and a melting section 3 which merge with one another. The melting section 3 has a length that is 2 to 2½ times as great as that of the clarifying section 2. The clarifying section 2 is the flat portion of the tank in which the burners 20 are disposed which serve for burning oil or gas.

Tank B furthermore has longitudinal walls 18 and cross walls 16 and 17 at the burner end and the charge feed end respectively. The upper part of the furnace is formed by a roof 1. The bottom of the melting section is identified by 9.

In the melting section 3 (zone II) are disposed bottom electrodes 6 which prevent the freezing of the glass bath in this area, especially in the immediate vicinity of the incoming charge. Freezing is prevented by a surface flow within the melting section 3 which constantly feeds highly heated glass from the clarifying section 2 heated by the burners 20 into the area of the charge feed. The charging is performed in a conventional manner along the entire width of the transverse wall 17.

In detail, tank B is built according to conventional technology, as described in older applications of the Applicant, so that no further description is needed. This applies especially to the configuration of the walls, the vault, the bottom, the burners, the electrodes and the outlet 19 at the end of the homogenization section 2a, and to the configuration of the exhaust gas stack openings 22 directly adjacent the batch feed.

In the interior of the tank, at the entry end of the clarifying section 2, a radiation barrier 5 extends from the roof to a point just above the bath surface 4. Radiation barrier 5 prevents radiation from reaching the melting section 3. At high chamber temperatures most of the energy is dissipated by radiation and it is therefore important to the invention to concentrate the energy delivered by the burners 20 in the clarifying section 2.

Since considerable additional amounts of radiation emanate from the bath surface and especially from the barrier 5 toward the charging end, the melting section 3 has a second radiation barrier 7 proximate to the charging end and a third barrier 8 intermediate barriers 5 and 7. Such an arrangement retards or prevents any appreciable amount of radiant energy from reaching the charging section D and heating the charge. The heating of the charge is thus performed almost exclusively by the flue gas which flows from the clarifying section 2 through the melting section 3 to the exhaust openings 22. The bottom in the clarifying section 2 is disposed horizontally.

Optionally, tank bottom 9 at the charging end of the clarifying section 2 has a threshold 14. It is essential that the bottom of the melting section 3 establishes a flow pattern in which hot glass floats on the bath surface back to the floating charge layer and there, in conjunction with the bottom electrodes 6, prevents the glass from freezing.

The exhaust gas, cooled to about 900° C., is fed after emerging from the tank to recuperators from which it leaves at a temperature of about 150° to 250° C. At this temperature the energy residing in the exhaust gas has largely been transferred to the combustion air.

In the recuperators the cooling exhaust gas preheats the combustion air to a temperature of about 700° C. The combustion air then passes through tubes to the burners 20. Since combustion takes place on the basis of relatively low air temperatures the flame temperatures are relatively low and therefore the concentration of the forming nitrogen oxides is not excessively high. The exhaust gas therefore is thus not only greatly cooled, but also has an extremely low concentration of nitrogen oxides, so that operation of the glass melting furnace according to the invention is possible also in low emission regions, e.g., in cities, inasmuch as the use of a dust filter is easily possible on account of the low exhaust temperatures.

It is important to the operation of the tank that the melting section 3 serves at its charging end exclusively for the preheating of the charge and that substantial melting of the charge does not take place until it reaches the burner end of the melting section 3. Then a clarification of the glass takes place in the clarifying section 2 before it is withdrawn in a known manner through a bottom tap 19.

Air can be introduced through the bottom in the clarifying section 2 through a number of bubblers. This introduced air, with the help of bottom electrodes if desired, produces a strong stirring of the glass in the clarifying section 2, so that the temperature gradient from top to bottom in the clarifying section is very low. This assures that the bath surface will reach temperatures of about 1550° to 1560° C., while the vault temperature above the clarifying section 2 will not exceed temperatures of 1580° C. The temperatures in the melting section 3 on the other hand are considerably lower, amounting to 1100° to 1300° C. from the charging end to the clarifying section 2.

Homogenization of the glass is performed in homogenizing section 2a with cooling so that an optimum temperature stratification is established which prevents circulatory flows and thus prevents bubbly and non-homogeneous glass from reaching the outlet.

The radiation barriers 5, 7 and 8 cause the establishment of a gas velocity over the charge of about 10 to 15 m/s, which permits a certain transfer of heat by convection in addition to the radiant thermal transfer. The radiant barriers are for example, apical arches, similar in construction to large doghouse bays.

The electrical energy input can furthermore be selected in proportion to the energy input by the burners such that the $NO_x$ mass flow does not exceed the allowable levels. The $NO_x$ mass flow varies inversely with the proportion of the electrical energy.

The glass melting furnace according to the invention can be constructed economically, since less expensive refractory material can be used in the charging section on account of the lower temperatures.

In the entire glass melting furnace, the ducts for the exhaust gas and for the heated combustion air are heavily insulated. Nevertheless it is surprising to the skilled practitioner of the art that the specific energy consumption can be reduced to the previously unattained level of 3100 to 3400 kilojoules per kilogram of glass.

In the clarifying section identified as zone I the burners are operated under air-starved conditions so that little or no $NO_x$ forms. The combustion gases then pass into zone II, namely the melting section 3. At that end of melting section 3 closest to the clarifying section 2, the flue gas temperature is already lower by about 150° than in zone I. The burners 20 above the melting section 3 are operated with an excess of air to achieve complete combustion of the hydrocarbon input, and to avoid any loss of efficiency. Again virtually no $NO_x$ is produced on account of the prevailing substantially lower temperature so that virtually $NO_x$ free flue gases enter the atmosphere. The glass melting furnace according to the invention can therefore operate advantageously in heavily populated areas.

It is furthermore important to operate with a mixture of a high percentage of cullet and a balance of the conventional charge material, so that it is possible to operate the furnace on inexpensive materials. Due to the ever increasing amount of recycled scrap glass, which at the present time cannot be sorted by colors, cullet of varying oxidation potential enters into the melting tank. A great amount of froth forms on the bath surface during reaction of glasses of different oxidation potential. The formed froth reflects the flame radiation and greatly interferes with the input of heat into the glass bath.

The froth can be greatly reduced by using a reducing flame, so that the new tank operates better under the unfavorable conditions prevailing when large amounts of waste glass are used.

The advantage of relative independence from the quality of the raw materials is all the more evident in the case of the apparatus according to FIGS. 4 to 9. Here the clarification and thus the quality of the glass is determined entirely independently of the melting section, since no back-flow occurs. Even inhomogeneous raw materials and heavy frothing or the use of caustic soda solution with a great amount of water for evaporation, does not have an effect on the quality of the glass. The homogenization is performed in the melting section by bubblers.

The savings achieved by the use of inexpensive raw materials far outweighs the cost of greater energy needs due to frothing.

The description that follows is limited to the difference in the configuration of the furnace according to the invention from the state of the art, which is sufficiently known.

According to FIGS. 4 to 9, the apparatus of the invention has three furnace and tank sections succeeding one another in the direction of flow, the melting section 3 being followed in the direction of flow by the clarifying section 2 and the latter by the homogenization section 2a. The charge is loaded in at the front (rheologically speaking) end of the melting section 3, and is carried toward the clarifying section 2. The temperature of the glass stream is highest in an especially shallow area 34 of the clarifying section 2, where the heating is performed either by burners 20 or by electrodes 36. It is indeed especially economically advantageous if the heat is supplied by conventional burners, in which case a complete elevation of the temperature of the glass bath is assured by the shallow depth of the bath in the area 34.

The uniformly heated glass therefore passes out of the area 34 into the homogenization section 2a, wherein the glass cools and flows down in a laminar flow without turbulence. The cooling assures that there is no departure from the stratification of the glass, so that eddying is reliably prevented.

Figure 5:
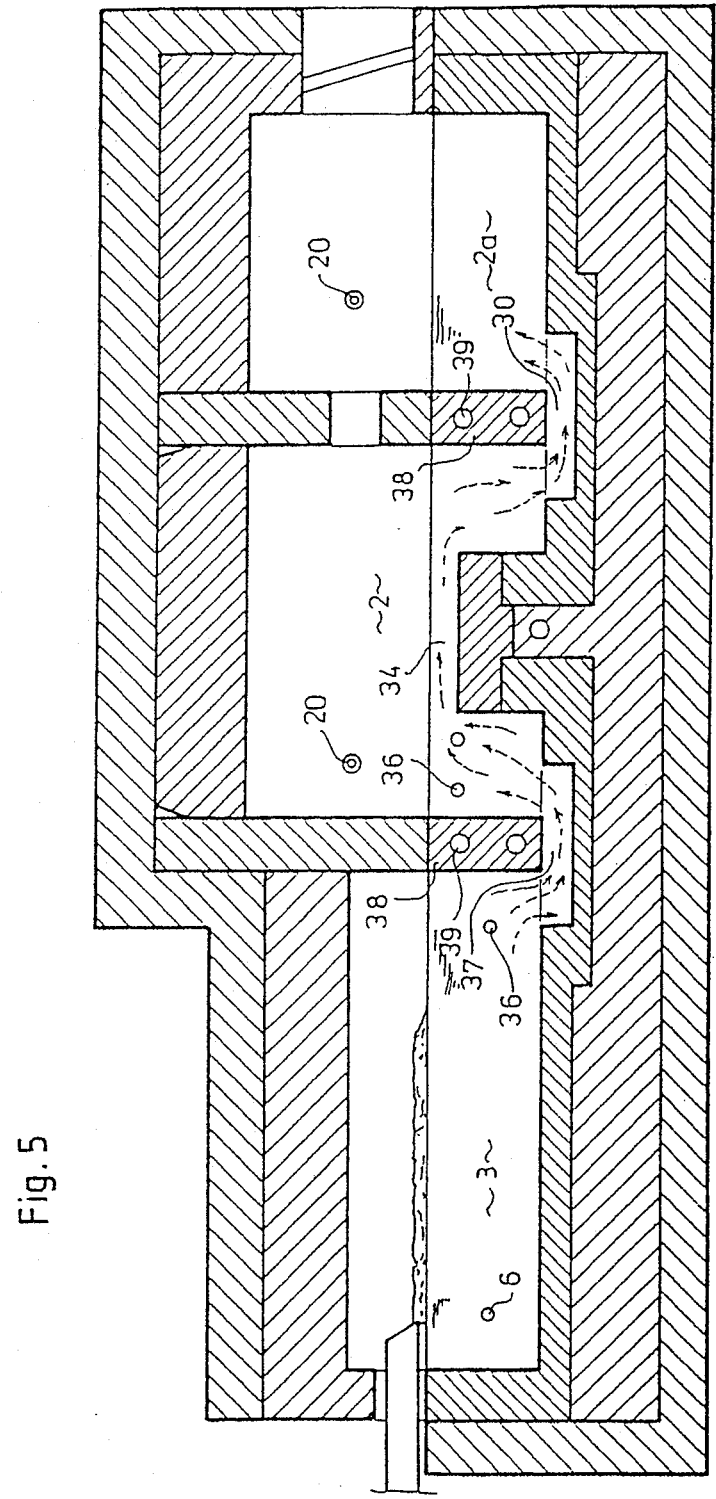
FIG. 5 is a longitudinal section through the actual melting tank embodiment of the invention.

In the embodiment of FIG. 5, flow into the clarifying section, however, is prevented by an air cooled arch 38 with an underpass 37. The cooling air, which can be used as combustion air, is carried in ducts of Inconel, for example, which is resistant to high heat.

After moving through the underpass 37 the glass, no longer mixed with the charge materials, flows upwardly in a laminar flow since here too the desired stratification is adjusted by the input of energy such that the coolest glass is on the bottom and the hottest on top. This temperature stratification here again causes a laminar flow without any turbulence. It assures that glass that has not been preheated will enter the actual clarifying zone and that glass already heated up will sink down again in the front portion of the clarifying section 2.

In order to assure a very strong input of energy in the melting section 3, roof burners 24 (FIG. 4) can be used, while a bubbler 25 is present under each of the roof burners to assure that cooler glass will continuously follow and that overheating will thus be prevented. A corresponding bubbler 25 can also be present under the point of entry of the charge or in the area of same, in order to produce a continuous flow of glass and prevent freeze-up.

Figure 4:
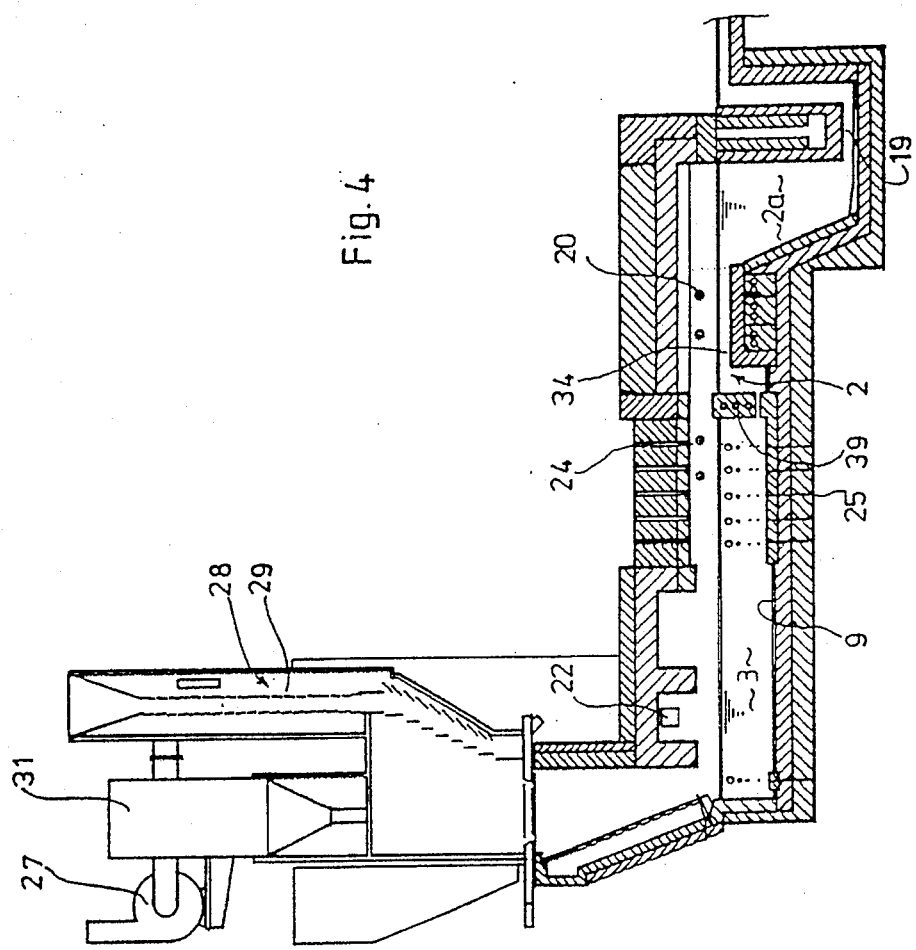
FIG. 4 is a longitudinal section through a glass melting furnace according to the invention.

According to FIG. 4, the charge and the cullet can also be preheated. The flue gases from the clarifying section 2 and the melting section 3 are drawn off in the charging area and carried countercurrently past both the charge and the cullet before being cleaned by an air separator 27 and discharged to the environment. The solids pass from the air separator 27 to the charge hopper 31, from which they fall or are carried away against the flue gas stream. The flue gas stream passes through the cullet dropping through the cullet chute 28, the latter having individual surfaces (plates) 29 which are spaced apart from one another and tilted inwardly so that the combustion gas stream can enter the cullet through the interstices between them.

Figure 2:
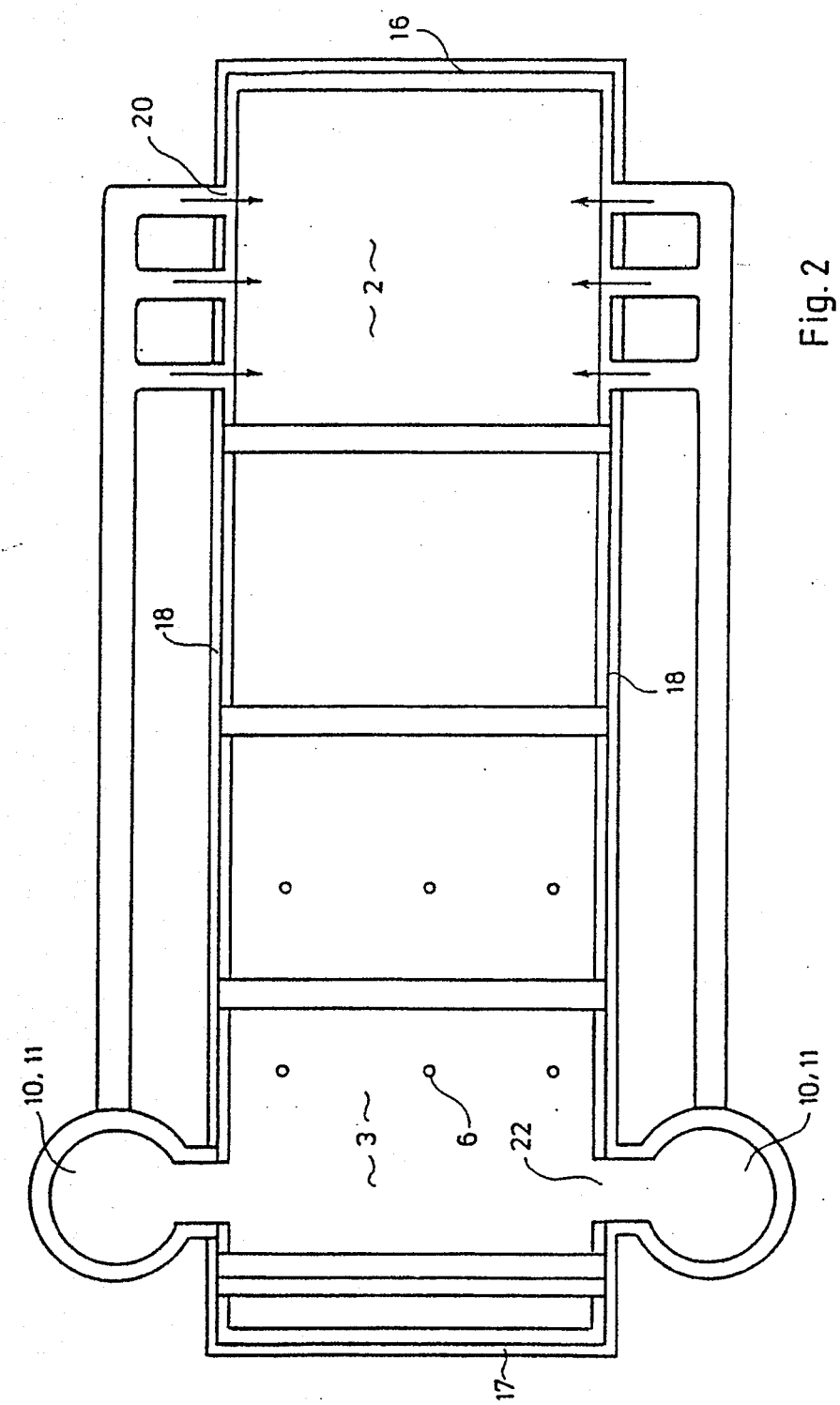
FIG. 2 is a plan view of a furnace similar to that of FIG. 1.
Figure 3:
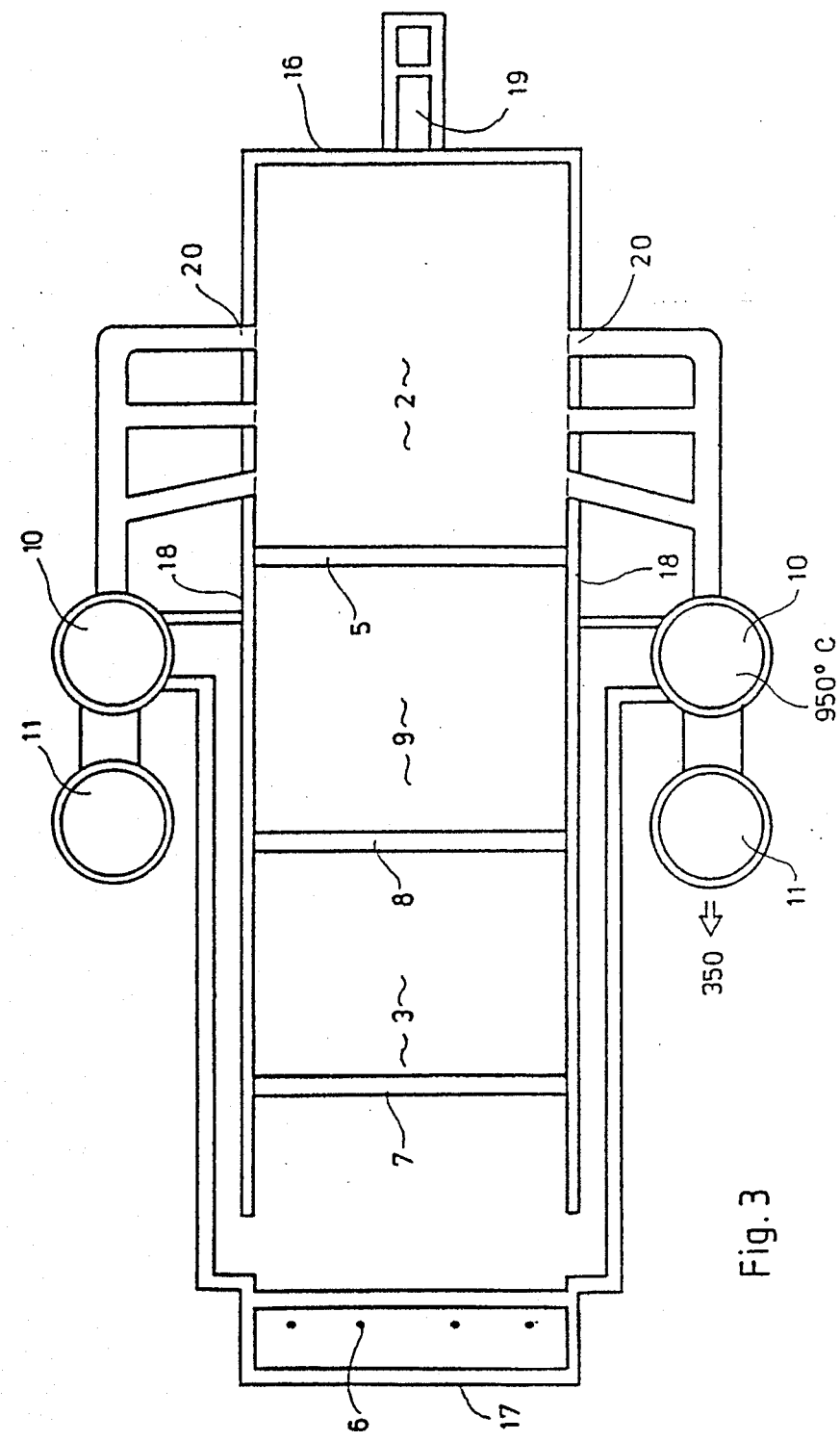
FIG. 3 is plan view of a furnace of an alternate embodiment of the invention.

To obtain special quality glass, the bottom of the homogenizing section 2a can be situated well below the level of the bottom of the melting section, in accordance with FIG. 2. The charge and cullet can be fed in and the flue gases removed through openings 22.

Figure 6:
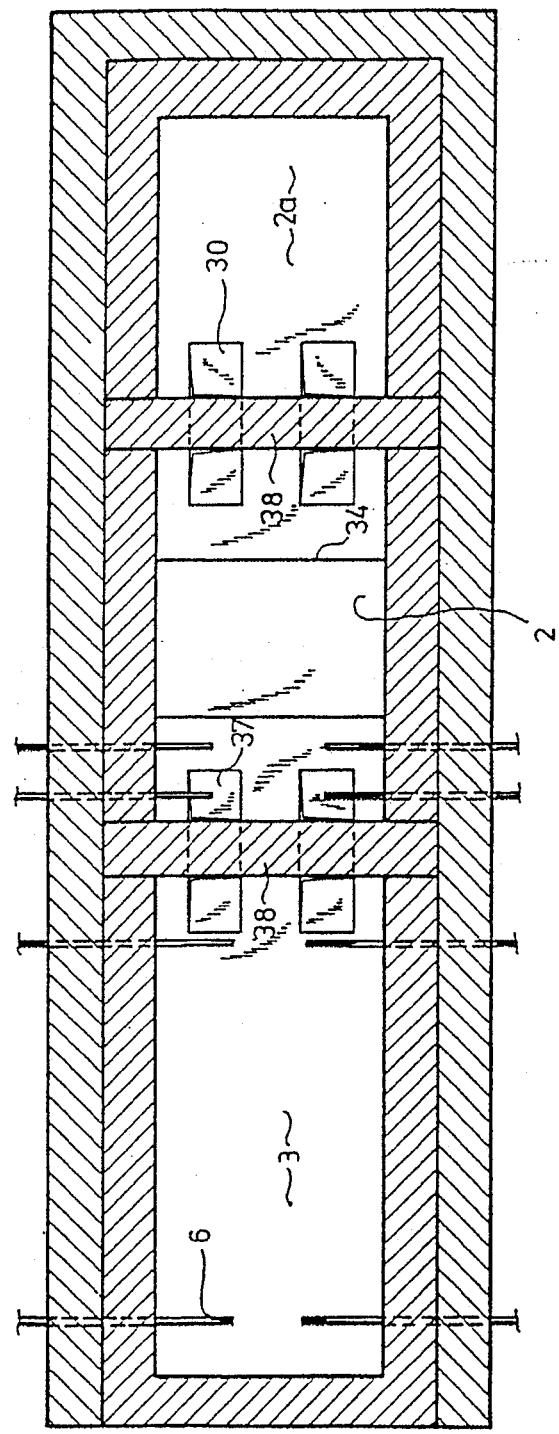
FIG. 6 is a plan view of the furnace of FIG. 5.

FIGS. 5 and 6 show a simplified embodiment of the furnace according to the invention, in which the heating is performed in the melting section 3 through electrodes 6. The charge spreads out over a considerable part of the melting section 3. The molten glass then flows, as in the furnace according to FIG. 4, through a bottom outlet 37 into the clarifying section 2 and is heated during its ascent by additional electrodes 6 and it is heated at the surface by one or more burners 20. Here again a laminar flow takes place during the ascent and the glass reaches its highest temperature in the area 34 in which the glass bath is shallow as described above.

The glass then moves in another laminar flow in the downstream portion of the clarifying section 2 to the additional bottom underpass 30 and from there into the homogenizing section 2a in which the losses and the desired adjustment of the temperature stratification can be compensated by the burners 20.

The arches 38 as well as the bottom of the clarifying section 2 can likewise be cooled by cool combustion air which is carried in ducts of refractory material.

Figure 7:
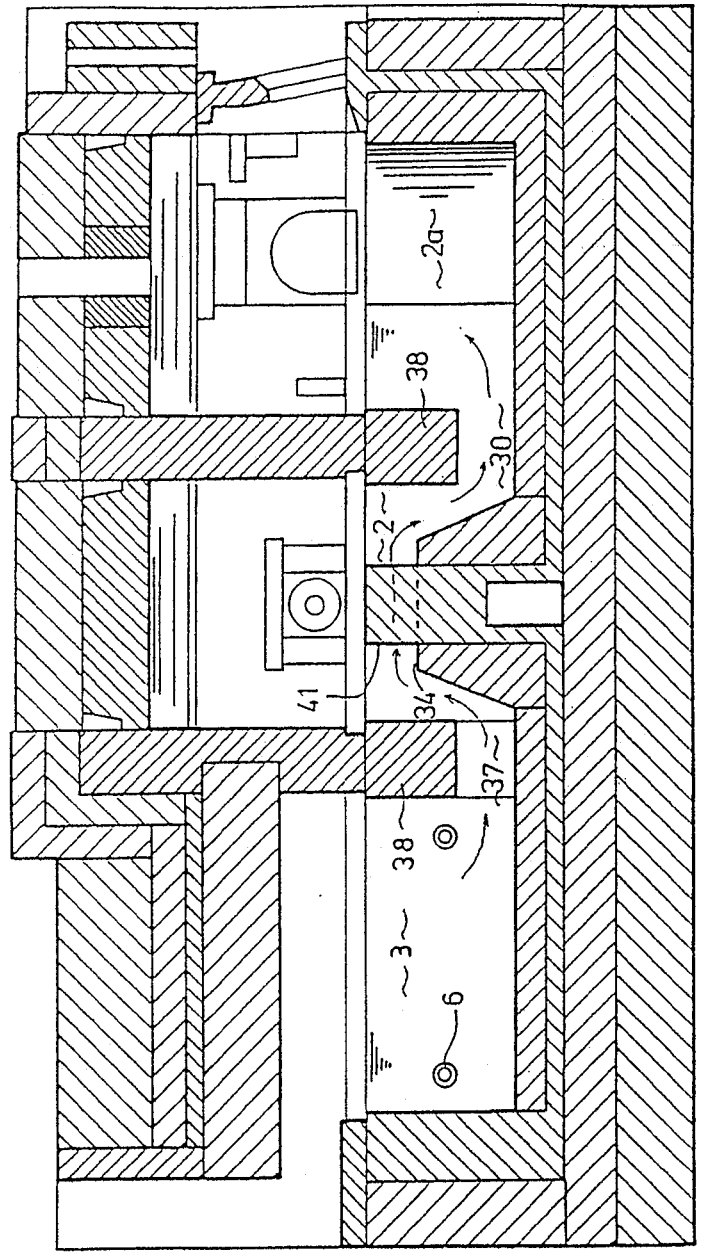
FIG. 7 is a longitudinal section through a melting tank appropriate for discontinuous withdrawal of molten glass.
Figure 8:
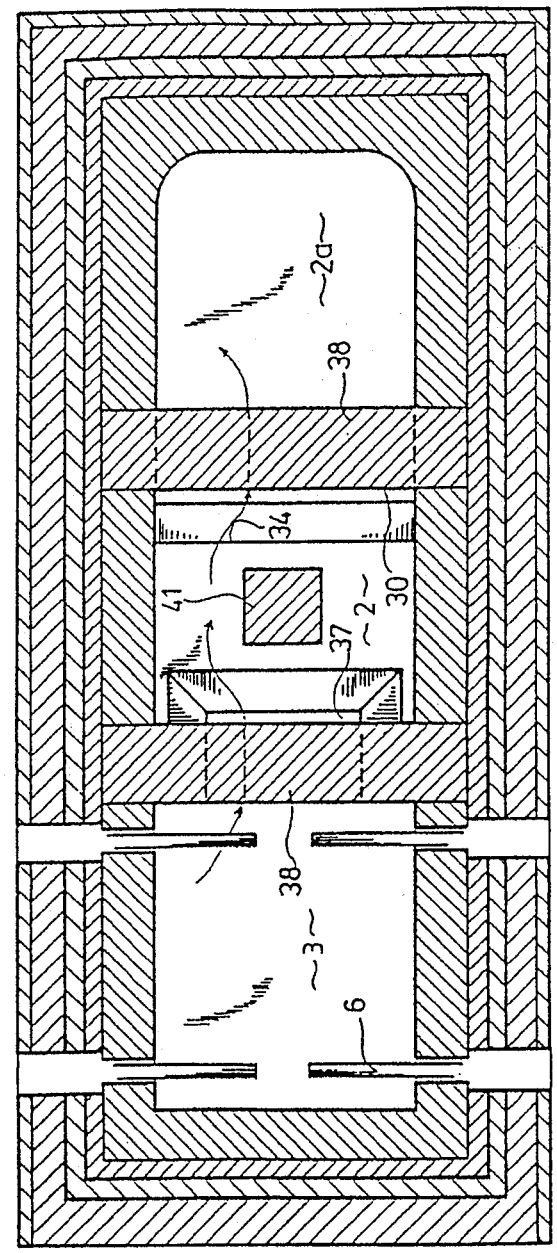
FIG. 8 is a horizontal section through the tank according to FIG. 7 at the level of the surface of the glass bath.
Figure 9:
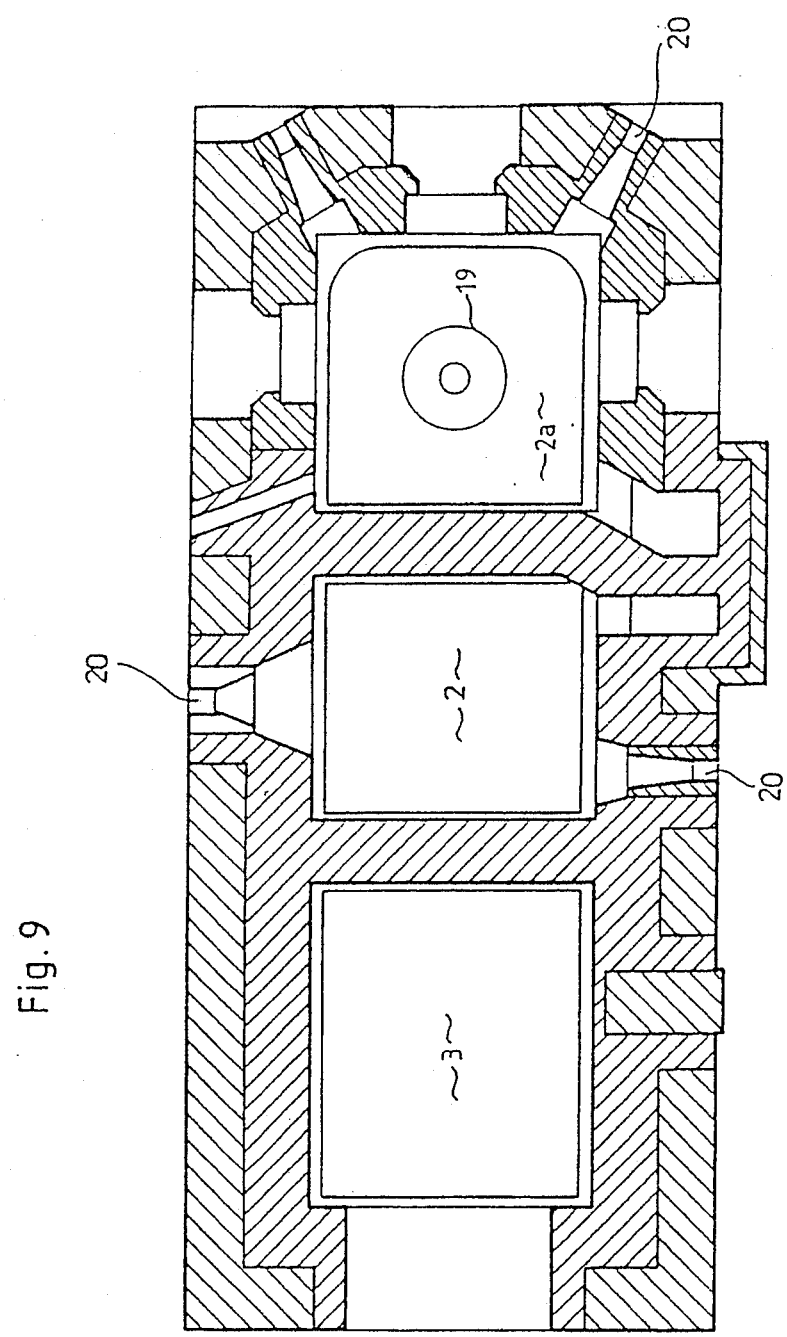
FIG. 9 is through the tank of FIGS. 7 and 8 above the surface of the glass bath.

According to FIGS. 7 to 9, the melting of the charge in the melting section 3 is performed again by the input of electrical energy through electrodes 6 and first an upwardly directed laminar flow and then a downwardly directed laminar flow pass through the clarifying section 2, as described in connection with FIGS. 5 and 6. Now, however, the homogenizing section 2a is a preferably indirectly heated working tank with burners 20 and an indirect heating means 26.

In order to reliably prevent any back flow, even if there is no removal of glass from the homogenizing section or from the working tank, a throttling insert 41 of refractory material is disposed in the clarifying section 2, which divides the flowing glass into two parts and also does not permit any horizontal eddying. Since the desired temperature stratification without turbulence is maintained even during standstill periods by the input of energy through the burners 20 in the clarifying section 2, this embodiment is especially suitable for furnaces from which molten glass is taken discontinuously. The indirect heating also assures that the desired temperature stratification within the homogenizing section 2a and the working tank will be sustained even if no molten glass is withdrawn. The temperatures therefore would be established in the desired manner even if there were no flow.

It is important to the invention, therefore, to establish a defined temperature stratification while avoiding any turbulence, this being achieved even during heating up and cooling down and in the area of the highest temperature on account of the shallow depth of the bath.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

I claim:
1. A method for melting glass in a glass melting furnace comprising:
   a. feeding a charge into a charging end of a melting section of the furnace;
   b. clarifying melted charge in a clarifying section adjoining the melting section;
   c. homogenizing the clarified melted charge in a homogenization section adjoining the clarifying section;
   d. withdrawing the homogenized material from the homogenization section;
   e. adding energy through electrodes under the charging end;
   f. adding most of the input of melting energy by burners disposed above the melt in the clarifying section, the burners producing flue gases;
   g. absorbing flame radiation from the clarifying section at its boundary with the melting section and above the melting section;
   h. dividing the space above the melt into zones of different temperature in which the highest temperature is in the clarifying section;
   i. preheating combustion air by heat exchange with the flue gases;
   j. feeding the preheated combustion air into said burners;
   k. passing the flue gases across the melting section countercurrently to the charge;
   l. exhausting the flue gases from the furnace near the charging end.
2. The method of claim 1 wherein the melt in the melting section is swept at its surface by a flow of melt countercurrently to the charge.
3. The method of claim 2 wherein some of the melt flowing countercurrently to the charge comes from the clarifying section.
4. The method of claim 1 further comprising
   operating the burners above the melt in the clarifying section under air-starved conditions to reduce the $NO_x$ formation; and
   operating burners disposed in a zone through which said exhaust gas next passes (zone II) with excess air to complete combustion, said zone II being at a lower temperature than zone I, said zone II being above the melting section.
5. The method of claim 4 wherein the temperature in zone II is set approximately 150° C. below that of zone I.
6. The method of claim 1 wherein the charge contains a high content of cullet.
7. The method of claim 6 wherein the flue gases, after emerging from the heat exchanger, flow through the cullet and are cooled thereby down to a temperature above the dew point of the fluid components contained therein.
8. The method of claim 7 wherein the cullet is guided so that plates therein slant downward and inward, whereby hot flue gases flow through spaces between the plates.
9. The method of claim 1 wherein the clarified melted charge is homogenized in a homogenization section which is deeper than the adjoining clarifying section.
10. A glass melting furnace, for producing a bath of molten glass, comprising
    a melting section having a charging end, and a sloping bottom which slopes downward toward said charging end;
    means for introducing a charge into said charging end;
    electrodes in said melting section for supplying electrical energy to said bath toward said charging end;
    a clarifying section of lesser bath depth than said melting section and adjoining said melting section opposite charging end;
    a homogenization section adjoining said clarifying section opposite from said melting section;
    burners disposed in said clarifying section, said burners producing flue gases;
    roof means over the furnace;
    a radiant heat shield between the clarifying section and the melting section, said radiant heat shield extending from said roof means to just above the bath surface;
    means for removal of the flue gases at the charging end; and
    heat exchange means for heating combustion air with the flue gas.

11. The furnace of claim 10 wherein the homogenization section is deeper than the adjoining clarifying section.

12. The glass melting furnace of claim 10 wherein the slope over the length of the melting section is constant and the bottom of the clarifying section is horizontally disposed.

13. The glass melting furnace of claim 10 having at least one additional heat shield extending from said roof means toward the bath surface in the melting section.

14. The glass melting furnace of claim 10 wherein said heat exchange means are recuperators divided into a high-temperature part and a low-temperature part.

15. The glass melting furnace of claim 10 further comprising means for injecting air bubbles into the bath in the clarifying section.

16. The glass melting furnace of claim 7 further comprising frit guiding means for cullet preheating, said guiding means being arranged to cause plates in said cullet to slant downward and inward, with openings formed between them for the entry of the hot combustion gases.

* * * * *